United States Patent [19]

Ottman et al.

[11] Patent Number: 5,142,680
[45] Date of Patent: Aug. 25, 1992

[54] METHOD FOR LOADING AN OPERATING SYSTEM THROUGH A NETWORK

[75] Inventors: Tadd V. Ottman, Fremont; Kevin S. Sheehan, Mountain View; Denis T. Flagg, Alto, all of Calif.

[73] Assignee: Sun Microsystems, Inc., Mountain View, Calif.

[21] Appl. No.: 343,843

[22] Filed: Apr. 26, 1989

[51] Int. Cl.⁵ .................. G06F 9/445; G06F 15/16
[52] U.S. Cl. ........................ 395/700; 395/600; 364/DIG. 1; 364/229.1; 364/236.2; 364/242.95; 364/243.5; 364/280.2; 364/283.1; 364/283.2; 364/284.4
[58] Field of Search ............. 364/200, 900; 395/700

[56] References Cited

U.S. PATENT DOCUMENTS

| | | | |
|---|---|---|---|
| 4,051,326 | 9/1977 | Badagnani et al. | 364/900 |
| 4,335,426 | 6/1982 | Maxwell et al. | 364/200 |
| 4,590,556 | 5/1986 | Berger et al. | 364/200 |
| 4,654,783 | 3/1987 | Veres et al. | 364/200 |
| 4,679,166 | 7/1987 | Berger et al. | 364/900 |
| 4,688,169 | 8/1987 | Joshi | 364/200 |
| 4,780,821 | 10/1988 | Crossley | 364/200 |
| 4,882,705 | 11/1989 | Yasue | 364/200 |
| 4,896,289 | 1/1990 | Svinicki et al. | 364/900 |
| 4,958,278 | 9/1990 | Meguro | 364/200 |
| 4,982,324 | 1/1991 | McConaughy et al. | 395/200 |

*Primary Examiner*—Gareth D. Shaw
*Assistant Examiner*—Matthew C. Fagan
*Attorney, Agent, or Firm*—Blakely Sokoloff Taylor & Zafman

[57] ABSTRACT

The method allows for the loading of operating systems between computers over a network, thereby drastically decreasing the amount of time required to download an operating system or update an operating system. A root directory is created and a subset of the operating system is loaded into the memory of the computer which is to receive the operating system, thereby eliminating the need to access or use the disk during the operating system download process. The subset of the operating system contains the basic commands for file creation and manipulation, directory creation and network communication. The computer system is then started using the subset of the operating system located in memory and connected to the network. Once the computer is connected to the network, the files comprising the operating system to be downloaded are copied and transferred from a remote computer over the network and stored on the disk drive of the receiving computer.

7 Claims, 2 Drawing Sheets

Hierarchical File System & Locally Attached Devices:

METHOD FOR LOADING AN OPERATING SYSTEM THROUGH A NETWORK

BACKGROUND OF THE INVENTION

1. Field of the Invention

This invention relates to the loading and upgrading of operating systems on computer systems connected in a network environment.

2. Art Background

An operating system consists of program modules within a computer system that govern the control of equipment resources such as processors, main storage, secondary storage and I/O devices. These modules resolve conflicts, attempt to optimize performance and simplify the effective use of the computer. They act as an interface between the user programs and the physical computer hardware. In order to load an operating system, an I/O device such as a tape drive executes a program resident in the tape drive and inputs the new operating system data into a predetermined area of memory in the computer. During the course of loading an operating system the disk space where the operating system is loaded is erased and re-written with the new operating system data. The amount of information to be loaded on the system is significant and takes one and one-half to two hours to read and down load the information from the tapes.

Before the advent of the distributed systems of today, a single computer system would service a multiplicity of users. Thus when it came time to upgrade the operating system, the system manager would only have to load the new operating system onto a single computer system. However, in today's distributed processing environment, it is quite common that each user has his own computer with its own operating system whereby the computer is networked together with other computers. Thus, when an operating system upgrade is performed, the process of loading the operating system from an I/O device has to be performed with respect to each individual computer system in the network. The upgrade of multiple computer systems can be quite time consuming, and it can be even more burdensome in an operating system development environment where operating system upgrades may be performed as frequently as once a week. Thus, it would be preferable in a distributed environment to load the operating system onto one machine from a tape and thereafter transmit copies of the operating system over the network to each computer system connected to the network.

If the operating system is transferred from one system to another through a network, the amount of time required to load the operating system is decreased. However, to load the system onto a computer in a network environment, the computer system must be booted and running an operating system accessible by the computer hardware and capable of network communication. It should be remembered that when the new operating system is loaded onto the computer the disk space is re-written thereby over-writing and corrupting the existing operating system concurrently being used by the computer hardware. A way to avoid the problem of over-writing the presently used operating system is to boot the computer system to be loaded or upgraded from an operating system resident on another computer in the network. That is, when the computer hardware is powered on a signal is sent out over the network to which the computer hardware with the operating system to be accessed responds. The remote network computer then provides disk partitions on its own local disk for the computer to use. The computer system to be upgraded is then booted using the operating system located on the network computer. Once the computer is booted and active on the network, the new version of the operating system can be down-loaded from the network computer system.

However, in order to utilize such an approach, the network must be configured and initialized to know that when the particular computer is powered on, that computer is to be booted using the operating system accessible on a specific network computer. Thus if the network configuration changes or if it is desirable to boot up from a different network computer than the one initially specified, the network parameters then have to be changed.

SUMMARY OF THE INVENTION

It is therefore an object of the present invention to provide a method for loading operating systems from one computer to another computer in a network environment.

In the method of the present invention a subset of the operating system supporting network communications is loaded into a root partition created in the transferee computer's memory. Once the transferee computer system is thus booted from and running off the memory resident operating system and connected to the network, it is ready to receive from the transferor computer system the new version of the operating system to be loaded on its disk. Because, the currently utilized operating system on the transferee computer is running off of memory as opposed to off the disk, the problems in the prior art with over-writing the currently utilized operating system when downloading the new version of the operating system are eliminated. In addition, the time required to download the operating system is decreased because the data transfer rate between two computer systems located on the network is much greater than that between a external I/O device, such as a tape drive and a computer. Also, updates to the operating system on the transferor computer do not entail the creation of tapes for the installation of the updated version of the operating system on the transferee computer.

BRIEF DESCRIPTION OF THE INVENTION

The objects, features and advantages of the method of the present invention will be apparent from the following detailed description of the preferred embodiment in which.

DETAILED DESCRIPTION OF THE INVENTION

An entire operating system can be transferred to a computer (transferee computer) from another computer (transferor computer) located on the same network. This capability is available by loading a subset of an operating system into a root directory established in RAM in the transferee computer thereby freeing the disk to receive the operating system files. The subset of the operating system to be loaded into RAM includes those commands necessary for the computer to connect and operate on the network thereby permitting the communication between the transferor computer and the transferee computer. By establishing the root directory in RAM and storing the operating system in RAM, the integrity of the system being installed on the disk is insured because all data relative to the running operating system is located within memory.

Throughout the discussion below, the method of the present invention is described with respect to the UNIX ® (UNIX is a Registered Trademark of AT&T) operating system and in particular, the Sun operating system, SunOS TM (SunOS is a trademark of Sun Microsystems, Inc.) manufactured by Sun Microsystems, Inc., Mountain View, Calif. However, as it will be clear from the discussion, the method of the present invention may be utilized in conjunction with most any operating system which provides for a network environment.

Figure 1:
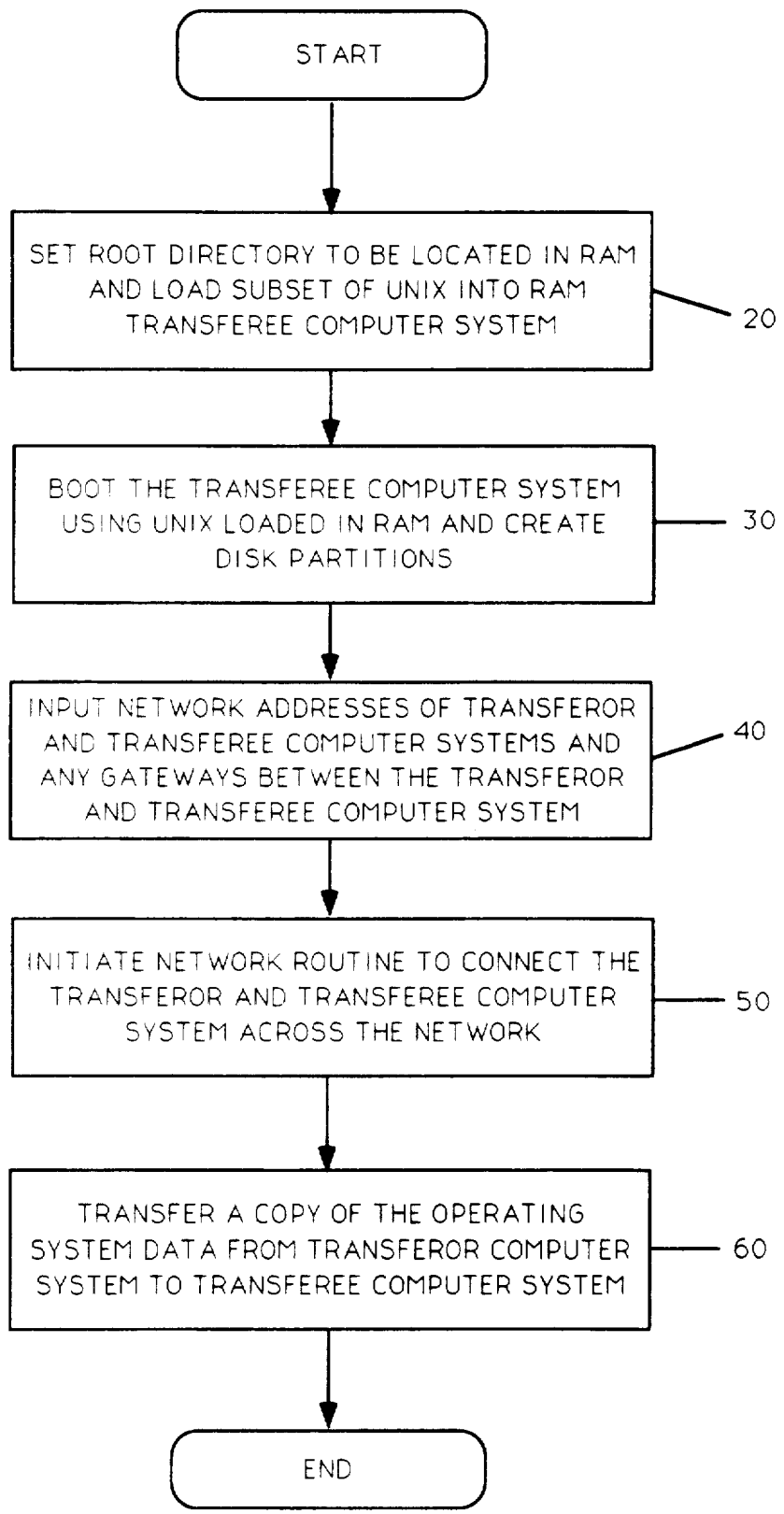
FIG. 1 is a flow chart outlining the steps performed in the method of the present invention.

The process for transferring an operating system across a network is described in the flow chart of FIG. 1. At block 20, the root directory is set to be in the RAM and a subset of the operating system is loaded into memory. This is typically achieved by powering up the system and interrupting the default loading of the operating system so that the root device can be reset to be the RAM and the operating system can be reinitialized to be located in RAM. Typically the subset of the operating system is transferred from a device, such as a tape, to the RAM. However, in a UNIX system, a subset of the operating system may be transferred from another computer connected through a network, using the Trivial File Transfer Protocol (TFTP), a low level, device specific, address specific protocol which permits a file transfer from one device to another over a network The subset of the operating system comprises only those commands required to boot the system and perform basic functions such as copy files, rename files, link files, create directories. In addition the subset should include commands to format the disk, mount file systems and establish and maintain network communications. Thus in the present embodiment, a subset of the UNIX operating system may be loaded in RAM. It should be noted, however, that the operating system loaded in RAM need not be a subset of the operating system to be transferred to the disk of the transferee computer. In SunOS, it is preferable that a superset of MUNIX is loaded into RAM. MUNIX is a very small subset of the UNIX operating system which is used to create disk partitions on new computer systems. The version of MUNIX used in the system of the present invention however, includes additional commands which permit the system to be connected to and active on the network and therefore can receive and transmit data. These extra commands give the computer the capability referred to, in the SunOS environment, as "client-side NFS."

Once the subset of the operating system is loaded into RAM, at block 30, the system is booted using the memory resident operating system, and the local disk where the new operating system is to be loaded is cleared. In addition, it is preferred that two disk partitions are created where the operating system will be stored. The first partition is linked to or mounted on the subdirectory of the root directory, and the second partition is mounted on the first partition. Thus when the operating system is loaded to the subdirectories of the root directory resident in RAM, the data will be transferred appropriately to the first or second disk partition. It is also preferred that another disk partition be created for the swapping of data during the execution of commands during the process. This disk partition provides the extra scratch memory that may be needed during the execution of certain commands executed during the transfer of the operating system. Typically, it is the same swap partition used by the computer during normal operation.

At block 40, the network addresses of the transferor computer and the transferee computer as well as the addresses of gateways that may be located between the two computers are input to the system, and at block 50 the network routine to connect the two computers is executed. For example, in SunOS a shell script routine is used to initialize the network environment which is NFS. NFS is a utility which provides a capability which permits one computer system to mount the remote disk space of another computer system in the network and use it as if it is locally attached disk space (For more information on NFS see R. Sandberg, D. Goldberg, S. Kleiman, D. Walsh, B. Lyon, Design and Implementation of the Sun Network File System, USENIX, Summer 1985, p. 119-130).

At block 60, once the transferor computer system is connected to the transferee computer system through the network, a copy of the new operating system is transferred from the transferor computer system to the transferee computer system. In the SunOS-NFS environment, the mount command is used to mount the file system of the transferor computer onto the root directory of the transferee computer to simplify the copying process and the UNIX TAR command is executed to transfer the files representative of the operating system. The TAR command archives and extracts multiple files into a single file archive called a TAR file. A TAR file is usually located on a magnetic tape but it can be any file. In the present case the file is virtually a stream of information between two TAR processes: one TAR process reading the operating system files on the transferor system, the other TAR process extracting files from the stream and writing them onto the disk of the transferee computer recreating the directories and the position and protection of files as they exist on the transferor computer system. Alternatively the file system of the transferor computer is mounted on a subdirectory of the root directory located on the disk drive of transferee system.

Figure 2A:
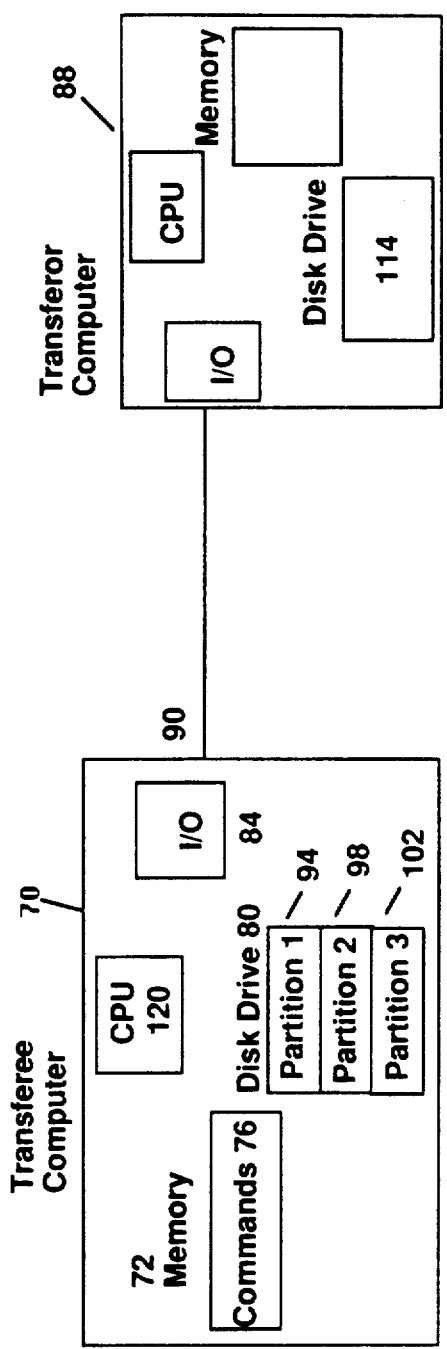
FIG. 2(a) is an illustration of the the computers used in the method of the present invention.

The invention described may further be illustrated with reference to FIG. 2. Referring to FIG. 2(a), the transferee computer 70 and the transferor computer 88 are shown. The two computers are connected in network 90. Transferee computer 70 contains central processing unit (CPU) 120, input/output devices 84, disk drive 80, and memory 72. Transferor computer 88 contains disk drive 114 and is configured the same as transferee computer 70. Commands 76, located in memory 72, are the subset of commands in the operating system being executed in transferee computer 70 in the preferred embodiment. Disk drive 80 contains the two partitions, 94 and 98, for receiving the operating system files and a third partition 102 for scratch memory as transferee computer executes the subset of the operating system command 76.

Figure 2B:
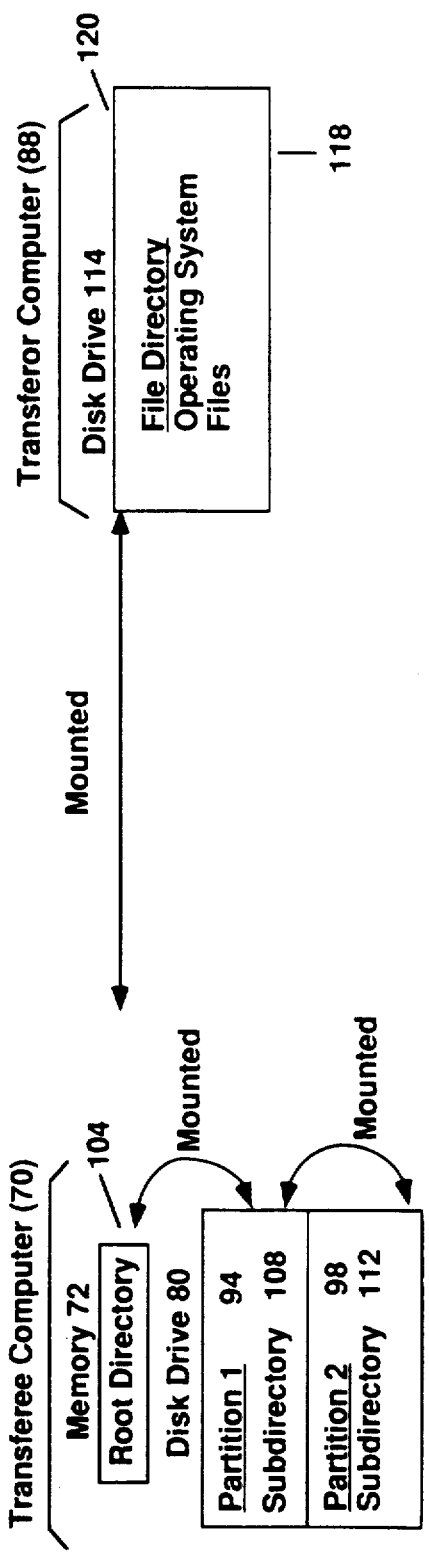
FIG. 2(b) is an illustration of the hierarchical file system and how it is locally attached in the present invention.

FIG. 2(b) illustrates the hierarchical file system and how the file system is locally attached among the disk drives and the partitions within the disk drives. Root directory 104, located on memory 72 of transferee computer 70, is the highest level of the hierarchical file system. Subdirectories 108 and 112 are created on disk drive 80 in partitions 94 and 98 respectively. Subdirectory 108, in first partition 94, is mounted on root directory 104, and subdirectory 112, in second partition 98, is mounted on partition 94. Similarly, file directory 120, located on disk drive 114, is mounted on root directory 104. Therefore, when operating system files 118 are loaded to subdirectories 108 and 112 of root directory 104, the files will be transferred to first partition 94 and second partition 98.

While the invention has been described in conjunction with the preferred embodiment, the UNIX operating system, and in particular SunOS running NFS, it is evident that numerous alternatives, modifications, variations and uses will be apparent to those skilled in the art. In particular it is evident, in light of the foregoing description, that a variety of computer types, operating systems and networks can be applied to the method of the present invention.

I claim:

1. In a computer network comprising a plurality of computers, each computer comprising a central processing unit (CPU), memory, offline storage, input/output devices, and a current operating system stored on a disk drive, a method for loading a transferring operating system onto a first one of said computers from a second one of said computers comprising:

setting a root directory in the memory of the first computer;

loading a subset operating system into the memory of the first computer from the offline storage of the first computer, said subset operating system comprising commands for copying files, creating file directories, formatting disk drives, and establishing a network connection and operation on the network;

initializing the first computer using the subset operating system;

initializing the disk drive of the first computer by executing the commands for formatting disk drives and creating file directories to create a hierarchical file system on the disk drive of the first computer having a base at the root directory;

establishing communications between the first computer and the network by executing the commands for establishing a network connection and operation on the network to communicate with the second computer; and copying operating system files of the transferring operating system in the second computer and loading the copy of the transferring operating system files from the second computer over the network into the hierarchical file system created on the disk drive of the first computer by executing the command for copying files in the first computer, whereby the disk drive of the first computer is rewritten with the copy of the transferring operating system loaded from the second computer without corrupting the subset operating system stored in the memory of the first computer.

2. The method of claim 1 wherein the step of establishing communications between the first computer and the second computer comprises the step of:

mounting a file system of the second computer which stores the transferring operating system files onto a subdirectory of the root directory set in the memory of the first computer.

3. The method of claim 1 wherein the transferring operating system is a UNIX operating system and the command for copying files from the second computer to the first computer is a UNIX TAR command.

4. The method of claim 1 wherein the step of initializing the disk drive of the first computer comprises the step of:

creating a disk partition on the disk drive of the first computer for temporary storage of data during the execution of the commands of the subset operating system by the first computer.

5. The method of claim 1 wherein the transferring operating system is a UNIX operating system.

6. The method of claim 1 wherein the step of establishing communications between the first computer and the second computer comprises the step of:

mounting a file system of the second computer which stores the transferring operating system files onto the root directory set in the memory of the first computer.

7. The method of claim 6 wherein the step of initializing the disk drive of the first computer further comprises the steps of:

clearing portions of the disk drive of the first computer where the transferring operating system is to be loaded;

establishing two partitions on the disk drive of the first computer where the transferring operating system is to be loaded;

mounting the first partition onto a subdirectory of the root directory;

creating a directory in the first partition; and mounting the second partition onto the directory created in the first partition, whereby the transferring operating system files are loaded onto the first and second partitions of the disk drive of the first computer.

* * * * *